United States Patent [19]
Bain et al.

[11] Patent Number: 5,287,434
[45] Date of Patent: Feb. 15, 1994

[54] BARCODE IDENTIFICATION SYSTEM SPOOLER

[75] Inventors: James M. Bain, Beavercreek; David J. Best, Miamisburg; James E. Globig, Hamilton; Dale E. Lamprecht, Jr., Dayton; James G. Markham, Spring Valley; Debra A. Stellwag, Dayton, all of Ohio

[73] Assignee: Monarch Marking Systems, Inc., Dayton, Ohio

[21] Appl. No.: 783,765

[22] Filed: Oct. 28, 1991

[51] Int. Cl.[5] .......................... G06F 3/08; G06F 3/12
[52] U.S. Cl. .................................. 395/101; 395/115; 395/114; 235/432; 235/462; 250/566
[58] Field of Search ............... 395/101, 115, 116, 250, 395/275, 114; 235/432, 462; 250/566

[56] References Cited
U.S. PATENT DOCUMENTS
4,875,174 10/1989 Olodort et al. ..................... 395/149

Primary Examiner—Robert L. Richardson
Attorney, Agent, or Firm—McAndrews, Held & Malloy, Ltd.

[57] ABSTRACT

A spooler is shown for a barcode information system. The spooler allows one printer to be assigned to one queue of the spooler, multiple printers to be assigned to a single queue; and a single printer to be assigned to multiple queues. The spooler is flexible in its configuration so as to allow print jobs to be distributed evenly among the various printers of the system. The printers of the system need not be the same and may be incompatible in that they communicate in different languages and/or they do not have the same format options. To minimize processing time, jobs may be terminated while in the process of printing. The jobs can later be restarted at the point in the job at which termination occurred. Further, format and graphic packets previously transmitted to a printer by the spooler for one job are not retransmitted to the same printer for subsequent jobs utilizing those same format and graphic packets so as to increase the efficiency of the system.

29 Claims, 13 Drawing Sheets

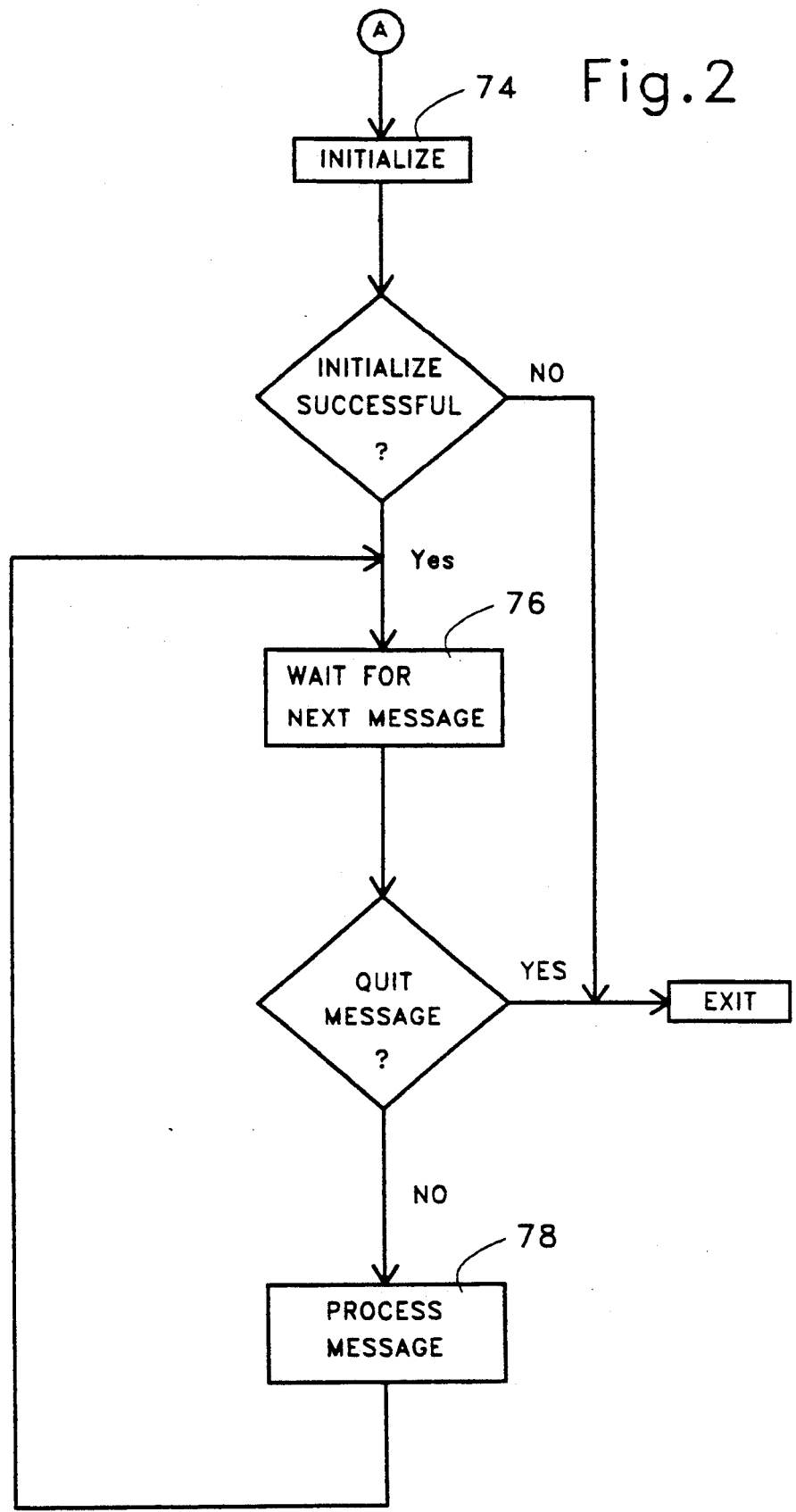

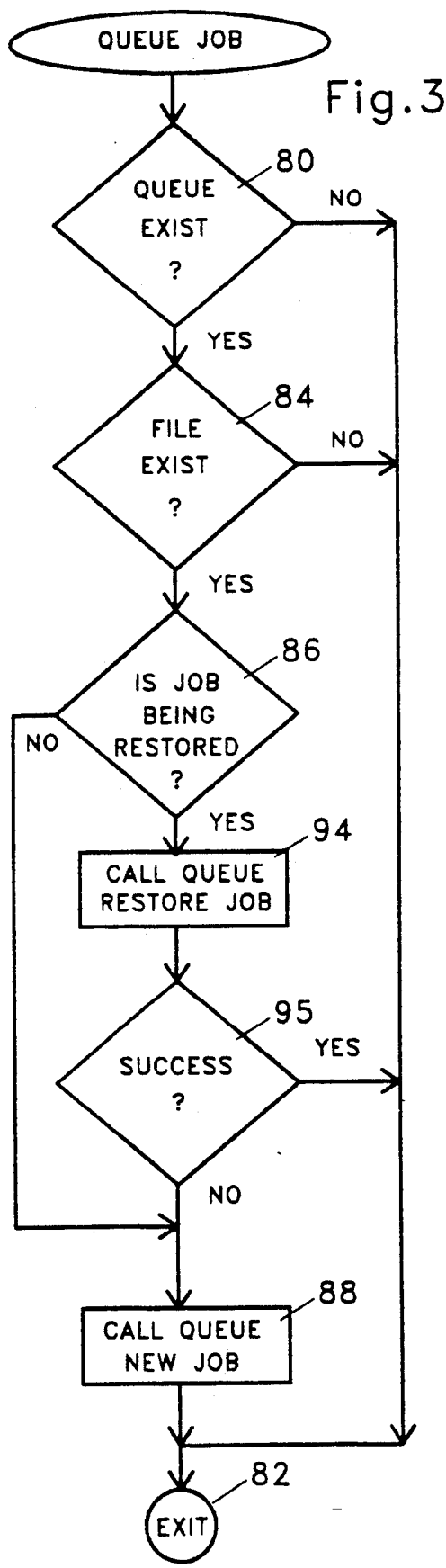
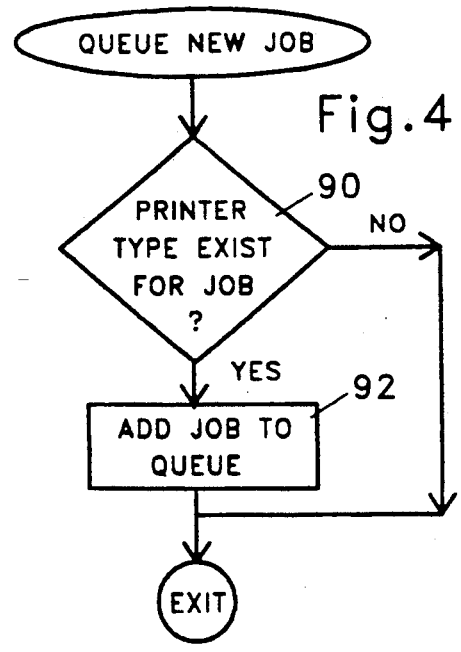
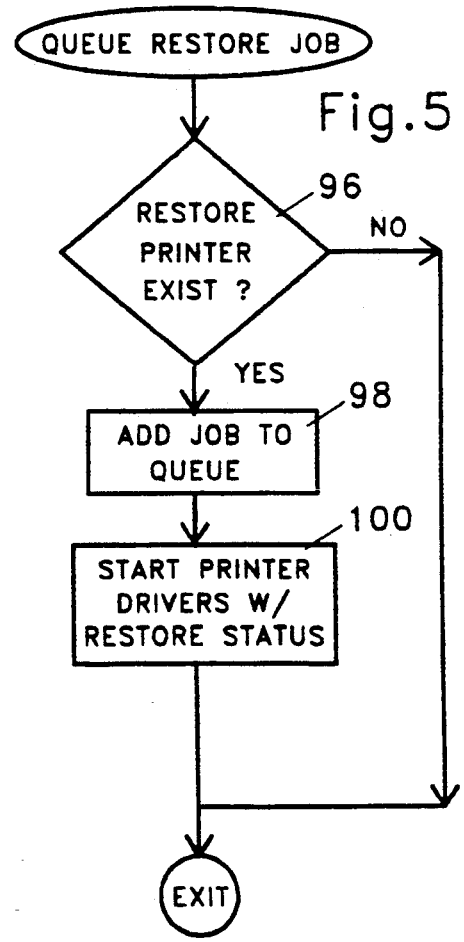

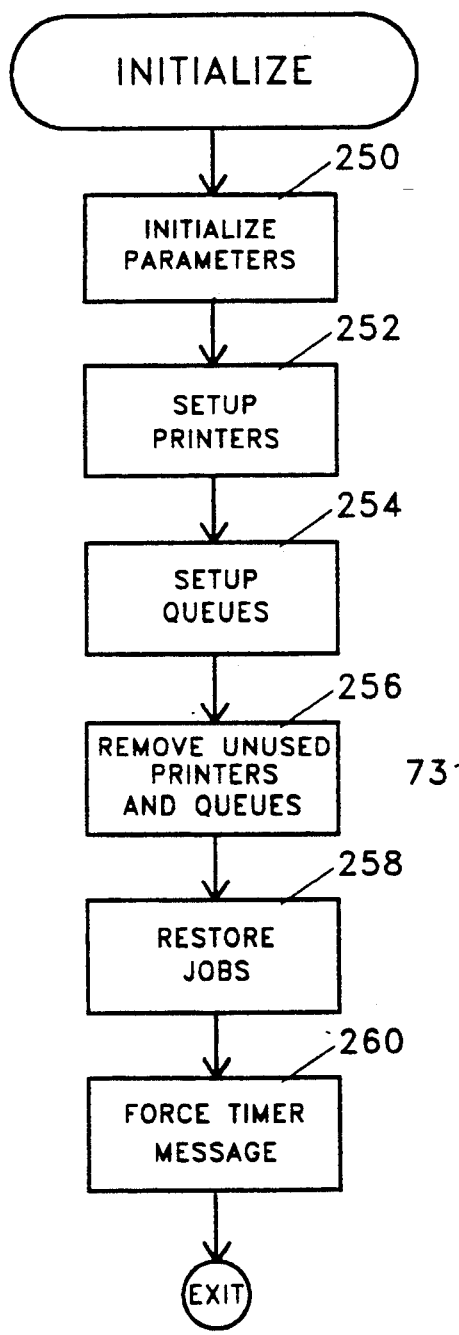

BARCODE IDENTIFICATION SYSTEM SPOOLER

TECHNICAL FIELD

The present invention is directed to a barcode identification system spooler for distributing jobs to be printed among a number of barcode printers of various, incompatible types; and more particularly to such a spooler that can be configured to assign multiple incompatible barcode printers to one queue or one barcode printer to multiple queues wherein a printer assigned to a given queue need not be capable of printing every job in that queue.

BACKGROUND OF THE INVENTION

Barcode identification systems having a number of barcode printers are known for printing jobs that include barcodes and associated alphanumeric characters on a web of record members such as tags, labels and the like Typically, barcode printers can print jobs in a limited number of formats. The format of a tag or label defines the type of data fields, i.e., bar code fields, alpha fields, numeric fields, etc.; the position of the fields on the tag/label; the font used to print alphanumeric fields if more than one font is available; magnification and rotation factors if any; etc. as is well known to those in the art of barcode identification systems. Printers of various types often have different format options. For example, not all printers can print in the same fonts. Because of the differences in printer format options, a job having a format capable of printing on one printer typically will not print on a printer of a different type.

One known barcode identification system utilizes a number of incompatible barcode printers as well as compatible barcode printers. As used herein, incompatible printers refers to printers that do not communicate in the same language and/or do not have substantially the same format options. In this known barcode identification system, a different queue is provided for each type of printer in the system. Although incompatible printers cannot be assigned to the same queue, each queue can have assigned thereto a number of printers of the same family, i.e., compatible printers that communicate in the same language and are capable of printing data in the same formats The printer-queue assignment in this known system is such that each printer assigned to a queue must be able to print every job listed in that queue. When a printer becomes ready to print, the spooler of this system transfers to that printer the top priority job as identified in the queue to which the printer is assigned. Although this system provides a somewhat even distribution of jobs among compatible printers attached to a given queue, it does not provide load leveling among all printers in the system, i.e., among incompatible printers attached to different queues.

Other spoolers for barcode identification systems are known to distribute jobs in a round robin manner among compatible printers. These systems are even less flexible than the known system discussed above in that no load leveling occurs. More particularly, when distributing jobs to compatible printers in a round robin manner, the spooler assigns a first job to a first printer, the next job to a second printer and so on until the last printer is assigned a job. At this point the spooler returns to the first printer and assigns another job to it, repeating the process until each of the printers has a second job assigned. Assigning jobs to barcode printers in this manner is extremely inefficient since one printer might have a number of very small jobs assigned to it and sit idle for most of a day, whereas another printer might be assigned a number of very large jobs each of which might take an entire day to print.

SUMMARY OF THE INVENTION

In accordance with the present invention, the disadvantages of prior barcode identification system spoolers have been overcome. The barcode identification system spooler of the present invention can be configured to assign multiple, incompatible barcode printers to one queue and each of the barcode printers may be assigned to multiple queues to provide a more efficient and flexible distribution of jobs among the system's printers.

More particularly, the barcode identification system spooler of the present invention includes a plurality of queues, each queue providing a prioritized list of jobs to be printed. Each of the queues is assigned to one or more barcode printers of the system wherein each printer can be assigned to one or more queues. The printers assigned to a given queue need not be compatible and in particular, each printer assigned to a given queue need not be capable of printing every job listed in that given queue. When jobs are assigned to queues, however, a check is performed to make sure that at least one printer assigned to a given queue is capable of printing the job before the job is added to that queue.

The spooler distributes jobs to the various barcode printers of the system by searching each of the plurality of queues for the highest priority job that is capable of being printed on a printer. This determination is not made until a printer is ready to print a job to insure that the jobs are distributed among the printers as evenly as possible. Further, if one job is capable of being printed on only one printer assigned to the queue in which the job is listed, jobs of lower priority in the same queue may be printed before that one job depending upon the availability of the one printer. This feature prevents a high priority job from holding up lower priority jobs that could otherwise be printed.

In accordance with the present invention, a given job might have a multi-printer format, i.e., a format capable of being printed on multiple incompatible printers. As discussed above, incompatible printers do not communicate in the same language and/or they do not have identical format options. A given job will, however, be able to print on incompatible printers if the format represents the intersection of the format option sets of the multiple printers. The spooler of the present invention does not determine which printer will print a multi-printer formatted job until print time so that jobs are not tied to a given printer at the time that the job is created. This increases the efficiency of the distribution of jobs among the printers of the barcode identification system.

Further in accordance with the present invention, each job may include a data packet, a format packet and/or one or more graphic packets. Multiple jobs may be printed by a given printer such that the data packet changes from job to job but the format and/or graphic packets do not change from job to job. In order to maximize the efficiency of the spooling operation, the spooler stores a record of format/graphic packets transmitted to a given printer and monitors format/graphic packets for subsequent jobs to prevent the retransmission of the same format packet or the same graphic packet to a given printer.

These and other objects, advantages and novel features of the present invention, as well as details of an illustrated embodiment thereof, will be more fully understood from the following description and from the drawing.

BRIEF DESCRIPTION OF THE DRAWING

FIG. 2 is a flow chart illustrating the main spooler software routine of the present invention;

FIG. 3 is a flow chart illustrating the Queue Job software subroutine of the spooler.

FIG. 4 is a flow chart illustrating the Queue New Job software subroutine of the spooler;

FIG. 5 is a flow chart illustrating the Queue Restore Job software subroutine of the spooler;

FIG. 11 is a flow chart illustrating the Initialize software subroutine of the spooler;

FIG. 12 is an illustration of the queue-printer matrix utilized by the spooler.

DESCRIPTION OF THE PREFERRED EMBODIMENT

Figure 1:
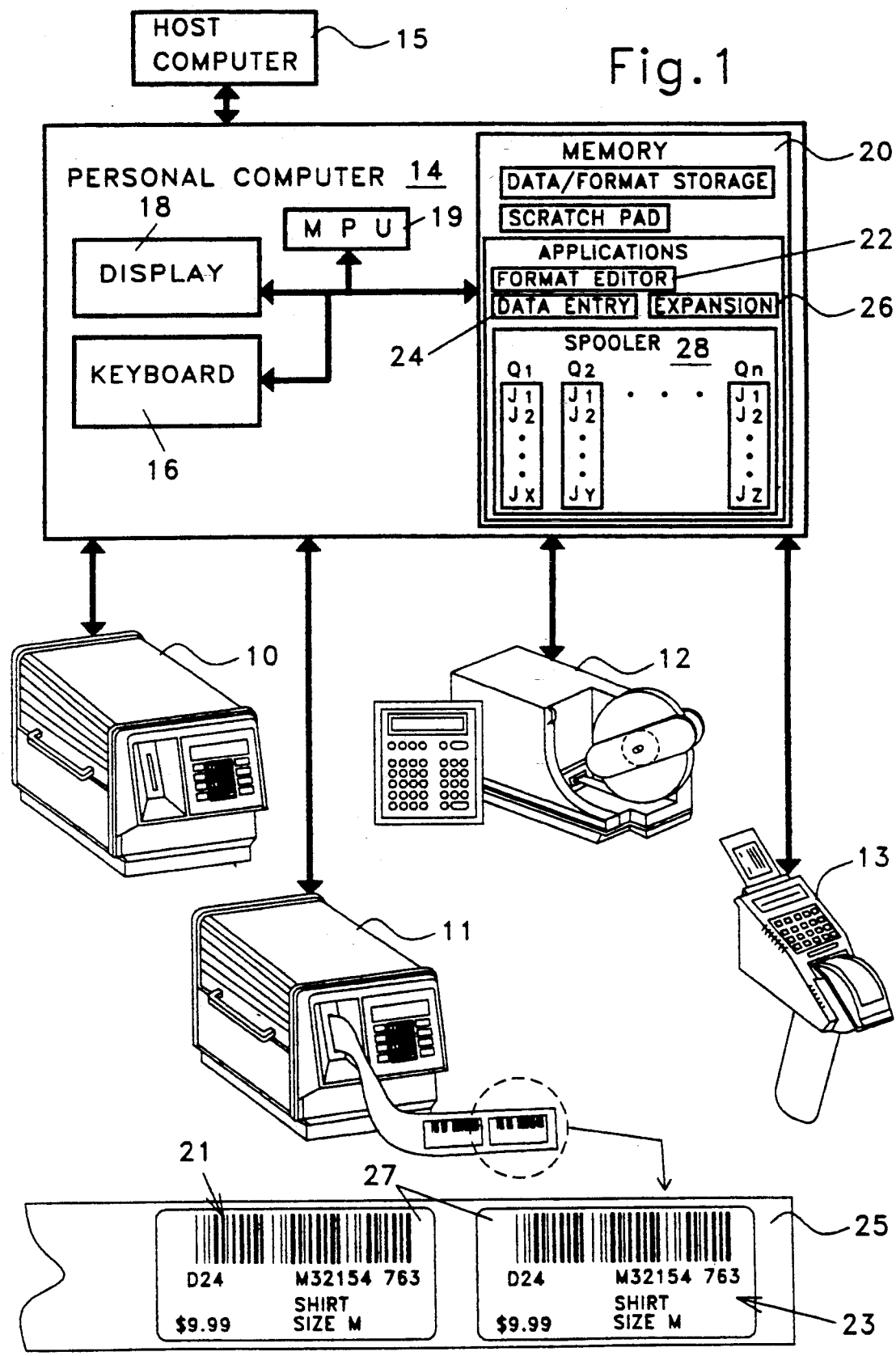
FIG. 1 is a block diagram of the barcode identification system of the present invention illustrating compatible and incompatible printers in perspective view.

The barcode information system of the present invention as shown in FIG. 1 allows a user to print, via a number of barcode printers 10, 11, 12 and 13, jobs entered into the system via a personal computer 14 hereinafter referred to as the P.C. 14. Each of the printers 10-13 is connected to the P.C. 14 through a RS 232 interface or the like. The system of the present invention also allows a host computer 15 to interface with the barcode printers 10-12 via the P.C. 14 so that print jobs or portions thereof can originate with the host computer. The P.C. 14 includes a keyboard 16 for entering information into the system in order to create a job to be printed. Although not shown, a mouse or other suitable input device may also be used. The P.C. 14 includes a display 18 to prompt the user to enter particular information and to provide feedback to the user regarding the operation of the system. The P.C. 14 includes a microprocessor 19 that operates in accordance with application software stored in a memory 20 to create the information necessary to print a job on one or more of the printers 10-13. It is noted that many more printers may be attached to the P.C. 14 for simultaneous operation thereof than is shown in FIG. 1. For example 32 printers may actually be attached to the P.C. 14 for simultaneous operation.

The barcode printers of the system may be compatible such as printers 10 and 11 in that these printers speak the same language and have the same user selectable format options defining the way in which barcode data 21 and related alphanumeric data 23 may be printed on a web 25 of record members 27 such as tags, labels, or the like. Alternatively, the barcode printers of the system may be incompatible such as printers 10, 12 and 13 in that the printers do not speak the same language and do not have the same user selectable format options. The user can, however, define multi-printer formats for a job to allow a job to be printed on any one of the incompatible printers for which the job was created as discussed below.

To create a typical barcode print job, the user first creates a format for the job utilizing a format editor routine 22. A suitable format editor is described in U.S. patent application Ser. No. 07/783,579 entitled Barcode Identification System Format Editor filed concurrently herewith, which application is assigned to the assignee of the present invention and incorporated herein by reference. That format editor allows a user to create a single format for a number of incompatible printers. Once the user selects the printer types for a format to be created or modified, the format editor automatically prompts the user to create a multiprinter format by providing to the user for his selection only those format options that are common to all of the selected printer types. Thus, the multiprinter format created is compatible with each of the otherwise incompatible printers.

After a format for one or more print jobs is created, a user may run a data entry routine 24 to interface with the user, prompting the user to select the format to be utilized for a job and to enter data for the job. A suitable data entry routine is depicted in U.S. patent application Ser. No. 07/783,770 entitled Barcode Information System, filed concurrently herewith, which application is assigned to the assignee of the present invention and incorporated herein by reference. During the operation of the data entry routine, the user enters a job name, the system automatically assigning a job identification number. The user also enters a file name for the job, the user selecting a format for the job when the job file is opened. The user further enters information identifying the destination queue for the job as well as the number of times the user wants to print a given job. For example, a job might consist of printing twenty tags having a particular barcode and that same job might be designated by a user to print five times. During the data entry routine, the user selects the priority of the job and also whether the job is to be deleted from a disk memory after printing or not.

When a job is ready to be printed as indicted by a user via the keyboard 16, an expansion routine 26 combines the data entered during the operation of the data entry routine 24 with the designated format generated by the format editor 22 and sends a print command to a spooler 28. As used herein the spooler refers to the microprocessor 19 operating in accordance with the spooler software routines described in detail below. The print command received by the spooler includes the job identification number, file name, destination queue, number of times that the job is to be printed, job priority, whether the job is to be deleted after printing, the number of printers that the job can print on and the types of printers that can print the job. The types of printers that can print a job are determined by the system from the selected format, each format being created for printers of one or more types as discussed above.

When the spooler 28 receives the print command for a job, the spooler looks at the destination queue designated in the print command and determines whether there is a printer assigned to the designated queue that is capable of printing the job. As discussed in detail below, during the configuration of the spooler, the user assigns printers to the queues of the spooler. The user may assign one printer to one queue; multiple printers to one queue or multiple queues to one printer. The printers assigned to a given queue may be incompatible. Further, each printer assigned to a given queue need not be capable of printing every job listed in that given queue. Therefore, when the spooler receives a print command for a job, the spooler determines from the information entered during the configuration of the spooler whether there is one printer assigned to the destination queue that is of a type listed in the job's print command as being capable of printing the job's format. If so, the spooler adds the job to the designated destination queue in a position associated with the job's designated priority.

The spooler 28 monitors the status of each of the printers 10-13 to determine when a given printer is ready to receive a job for printing. When the spooler finds a printer that is ready to print a job, the spooler searches each of the queues for the highest priority job capable of being printed on the same type of printer as the ready printer. Thereafter, the spooler transfers the highest priority job that is found to the ready printer for printing. If one job of a given priority can only be printed on a single type of printer and there are no printers of that type ready to print, the spooler will hold back that one job. The spooler may, however, transfer other jobs of lower priority from the same queue to printers of other types that are ready to print and capable of printing the lower priority jobs. Thus a high priority job will not hold up the printing of lower priority jobs that can be printed on printers other than required by the higher priority job.

By allowing multiple printers to be attached to a single queue, high print job throughput for environments that print large quantities of tags and labels may be obtained. By distributing the print load among several printers assigned to a given queue, load leveling of print jobs is achieved so that the best use of idle printers is made. Further, because each printer can be attached to multiple queues, one queue listing jobs to be printed on stock of one size can be suspended and receiving jobs while another queue listing jobs to be printed on stock of a second size is active. At some point in time, the queue that was active may be suspended so that the printer's stock, i.e., web of record members, can be changed and at the same time, the previously suspended queue can be resumed so that the printer can start printing jobs from that queue.

Figure 13A:
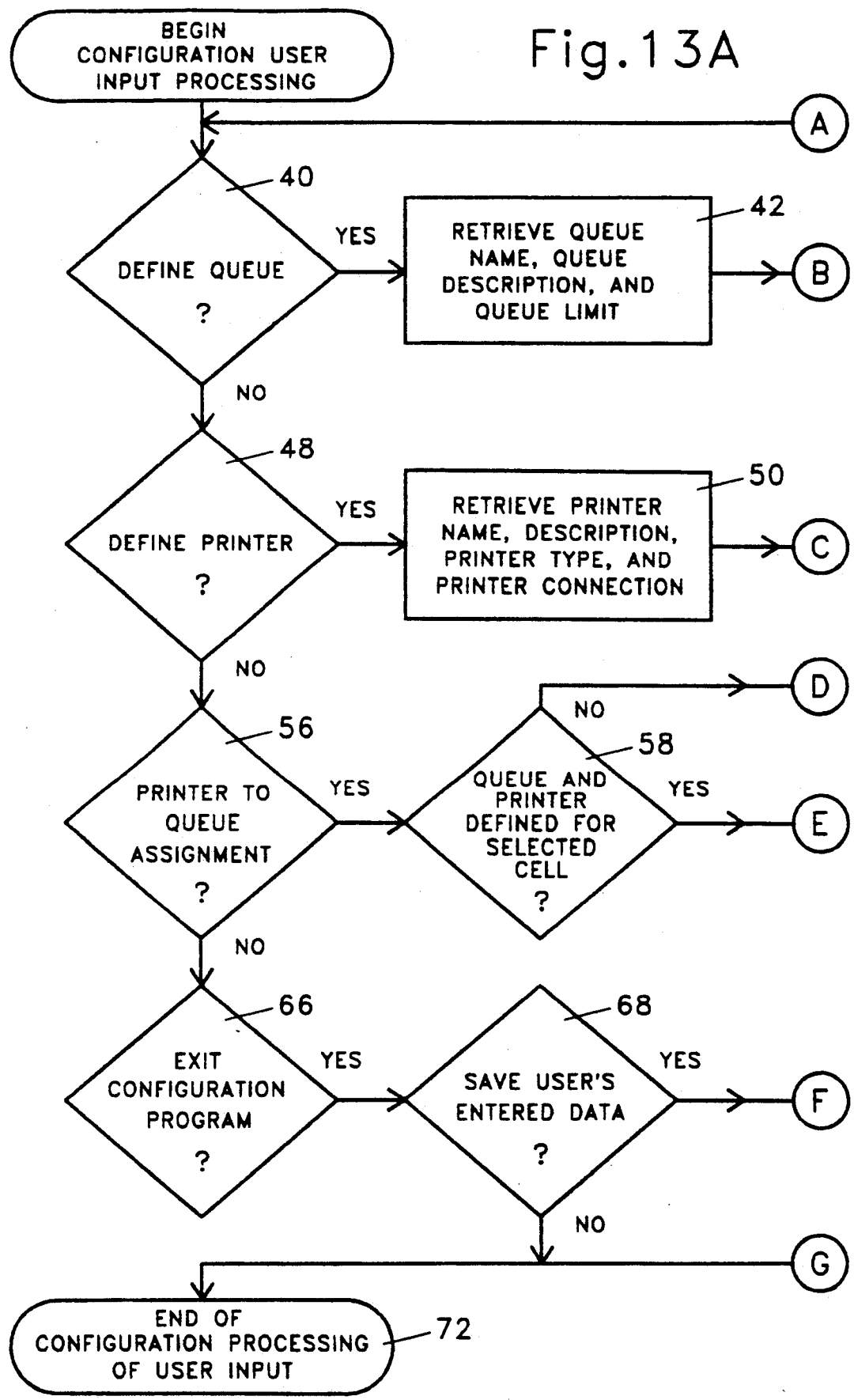
FIGS. 13A and B form a flow chart illustrating the spooler configuration software subroutine.
Figure 13B:
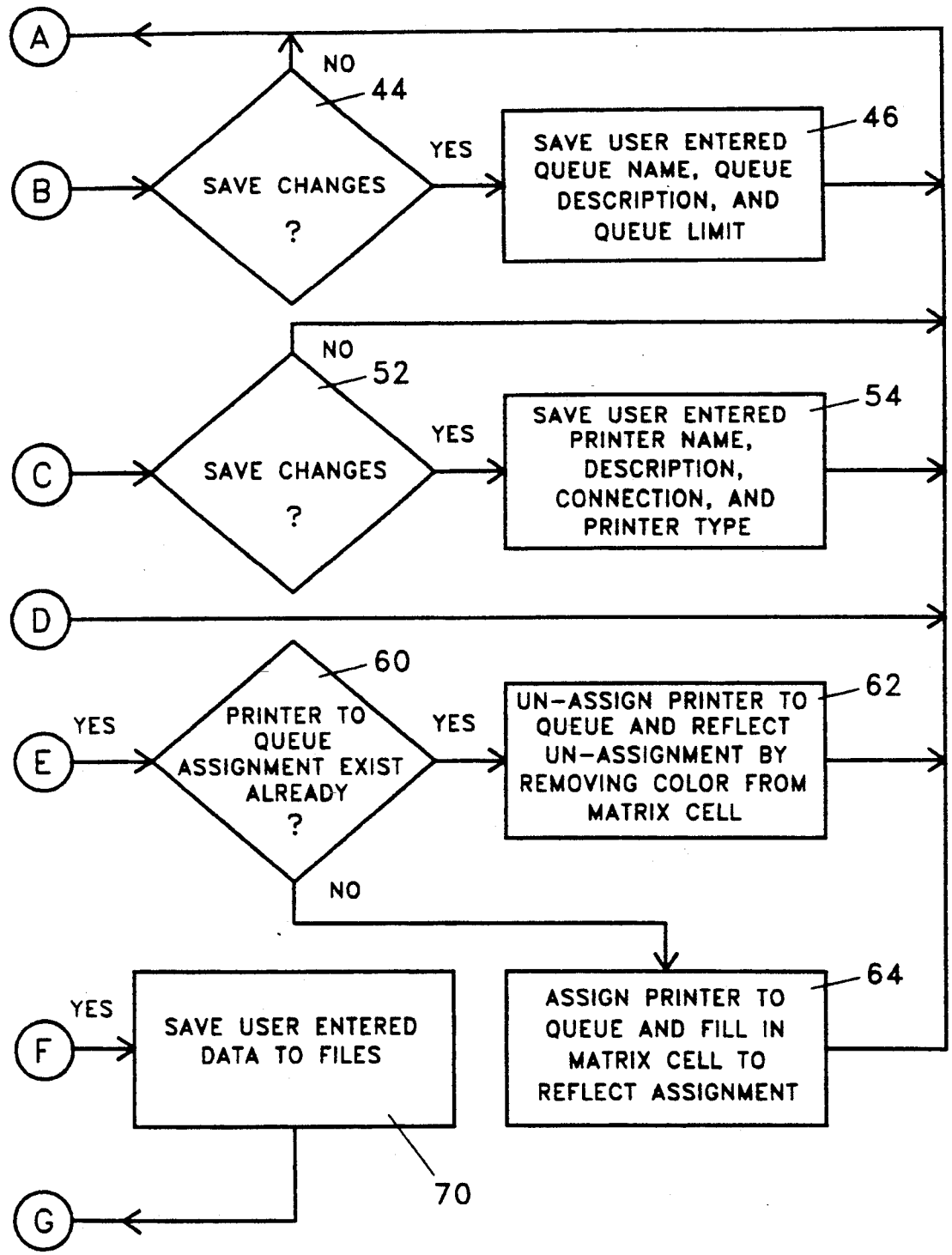

As shown in FIG. 13, the user may configure the spooler by defining the queues thereof; by defining the printers attached to the system; and assigning defined printers to defined queues wherein multiple printers may be assigned to a single queue and each printer may be assigned to multiple queues. More particularly, when the spooler configurator subroutine is called, the microprocessor 19 at block 40 determines whether the user has indicated via the keyboard 16 that he would like to define a queue. If so, the microprocessor 19 at block 42 retrieves the name of the queue, the queue's description and the queue limit, i.e., the maximum number of jobs to be listed in the queue, as entered by the user. Thereafter, at block 44, the microprocessor 19 determines whether the newly defined queue is to be saved and if so the microprocessor at block 46 saves the user entered queue name, queue description and queue limit. If the microprocessor 19 determines at block 48 that the user is defining a printer, the microprocessor proceeds to block 50 to retrieve the printers name, description, printer type and printer output connection port as entered by the user. Thereafter, the microprocessor at block 52 determines whether the newly defined printer information is to be saved. If so, the microprocessor 19 proceeds to block 54 to save the user entered printer name, description, printer type and output connection port.

If the user indicates via the keyboard 16 that he would like to make a printer to queue assignment, the microprocessor 19 controls the display 18 to depict a printer-queue matrix as shown in FIG. 12. The printer-queue matrix has an input position associated with each possible printer-queue assignment. For example the input position 73 is associated with the assignment of printer $P_1$ to queue $Q_3$. The user makes a printer to queue assignment by moving a displayed cursor to the matrix input position associated with the desired assignment. After a printer to queue assignment is made, the microprocessor at block 58 determines whether the queue and printer associated with the selected input position are defined. If the queue and printer are defined, the microprocessor proceeds to block 60 to determine whether the printer associated with the selected input position is already assigned to the queue that is also associated with the selected input position. If so, the microprocessor proceeds to block 62 to eliminate the printer-queue assignment associated with the selected input position. The microprocessor also controls the display 18 to reflect the elimination of the assignment by removing color from the selected matrix input position.

If the microprocessor 19 determines at block 60 that a printer to queue assignment did not already exist for the selected matrix input position, the microprocessor proceeds to block 64. At block 64, the microprocessor 19 assigns the printer associated with the selected input position to the queue that is also associated with the selected input position. At block 64 the microprocessor also causes the display 18 to reflect the printer to queue assignment by adding color to the selected matrix input position. Thereafter, the microprocessor proceeds to block 40 to determine whether other queues or printers are being defined or whether other printer-queue assignments are being made. When the microprocessor 19 determines at block 66 that the user would like to exit the spooler configuration routine, the microprocessor 19 proceeds to block 68 to determine whether the user wants to save the data that he has entered. If so, the microprocessor proceeds to block 70 to save the user entered data to memory and exits the spooler configurator subroutine at block 72.

As shown in the main spooler routine depicted in FIG. 2, once the spooler has been successfully initialized at block 74, the spooler waits at block 76 for the next message to be processed at a block 78. One message that can be received by the spooler is a print command which as discussed above includes (1) the identification of a job, (2) the job's file name, (3) the destination queue of the job, (4) the number of times the user wants to print the job, (5) the priority of the job, (6) whether the job is to be deleted from the storage disk after printing or not (7) the number of printers that the job can print on, and (8) the types of printers that the job can print on. Receipt of the print command causes the microprocessor 19 to operate in accordance with the queue job routine depicted in FIG. 3 wherein the job identified by the print command is added to the destination queue specified in the print command. Another message processed by the microprocessor in accordance with the spooler routine at block 78 is a timer message. Periodically a timer message will be generated to cause the microprocessor 19 to operate in accordance with the subroutine depicted in FIG. 6 wherein the state of each printer 10-13 of the system is determined and if a printer is found to be idle and ready to print, the spooler distributes a job thereto. Another message processed at block 78 is the terminate message which causes the microprocessor to operate in accordance with the routine depicted in FIG. 9. As discussed below, if the spooler receives the terminate message, the user may choose to save the current processing state of the spooler so that in addition to saving all of the jobs on the queues to a file, the states of the jobs currently being processed, i.e., sent to a printer, are also saved so that the jobs can be continued on the same printer when the spooler is later restarted. Other messages processed at block 78 include the suspend, resume, delete and change request messages.

If the microprocessor 19 determines that a suspend queue message has been received, the microprocessor at block 78 processes the message by first determining whether there are any jobs currently printing. If not, the microprocessor suspends the identified queue such that the suspended queue can receive jobs from the spooler but the spooler will not send the jobs listed in the suspended queue to a printer. If the microprocessor 19 determines that a job listed in the queue to be suspended is currently being distributed to a printer for printing, the microprocessor marks the queue as "suspend in progress"; finishes the distribution of the current job to the printer; and thereafter prevents the distribution of a new job from the suspended queue although jobs can still be added to the suspended queue. In response to a suspend printer message, the microprocessor 19 at block 78 processes the message by immediately suspending the printer if a job is not currently being distributed to the printer. Otherwise, the microprocessor marks the printer as "suspend in progress"; finishes the distribution of the current job to the printer and thereafter prevents further jobs from being distributed to the suspended printer. In response to a suspend job message, the microprocessor 19 at block 78 processes the message by determining whether the identified job is in the process of being distributed to a printer. If so, the microprocessor ignores the suspend job message. However, if the job is not in the process of being distributed to a printer, the microprocessor 19 immediately suspends the job so that it will not be distributed.

The microprocessor 19 responds to the receipt of a resume queue, resume printer or resume job message by respectively removing the suspended status from the identified queue, printer or job so that the spooler can continue to process with respect to the queue, printer or job. The microprocessor 19 responds at block 78 to a delete queue message by deleting all of the jobs listed in the identified queue. The microprocessor responds to a delete job message by deleting the single job identified in the message. After a job is deleted, the microprocessor 19 lists the deleted job in a history queue. Jobs that have been distributed to various printers are also listed in the history queue. It is noted that if a job is currently printing on a queue that is to be deleted or if that particular job is to be deleted, the job is aborted as discussed below so that no more packets of information for the job are sent to the printer that had been receiving the job. In response to a change request message, the microprocessor 19 at block 78 reassigns the priority of a designated job or moves the job to a different queue as indicated by the user in issuing the change request via the keyboard 16. Only those jobs not in the process of being distributed to a printer may be changed. In response to a quit message, the microprocessor 19 leaves the spooler.

When a print command, identifying a job to be printed, is received, the microprocessor 19 in accordance with the queue job routine depicted in FIG. 3 determines at a block 80 whether the destination queue designated in the print command exists. If not, the microprocessor at block 82 exits the subroutine. If the destination queue does exist, the microprocessor 19 proceeds to block 84 to determine whether the designated job file exists and if so, the microprocessor proceeds to block 86 to determine whether this is a job that is being restored. If not, the microprocessor at block 88 calls the queue new job subroutine depicted in FIG. 4.

In the queue new job routine, at block 90 the microprocessor determines whether the destination queue designated in the print command has at least one printer assigned to it of the type for which the job's format was created. That is, the microprocessor 19 determines whether the designated destination queue has an assigned printer of a type that is also designated in the print command. If so, the microprocessor 19 determines whether the maximum number of queueable jobs for the designated destination queue has been exceeded. If the maximum number of queueable jobs has not been exceeded, at block 92 the microprocessor 19 adds the job identified in the print command to the designated destination queue in a position in the queue that represents the job's priority. The information stored in the queue for each job added includes the information provided by the job's print command except the identity of the destination queue and the job's priority, this information being redundant.

If the microprocessor 19 determines at block 86 that the job identified in the print command is being restored, the microprocessor calls the queue restore job routine depicted in FIG. 5. Upon entering the queue restore job routine, the microprocessor 19 at block 96 first determines whether the printer to which the restored job was being distributed to at the time of termination still exists, i.e., whether the printer is still attached to the system. If so, the microprocessor 19 adds the job to the destination queue giving the job the highest priority Thereafter, the microprocessor 19 at block 100 starts the printer driver for the printer on which the restored job is to print and sets the state of that printer to the printer state stored during the termination operation discussed in detail below. If the microprocessor determines at block 96 that the printer to which the job is to be restored does not exist, the microprocessor returns to the Queue job routine of FIG. 3 and at block 95 determines that Queue Restore Job was not a success. The microprocessor 19 then proceeds to block 88 to add the job to a queue as if it were a new job.

Figure 6A:
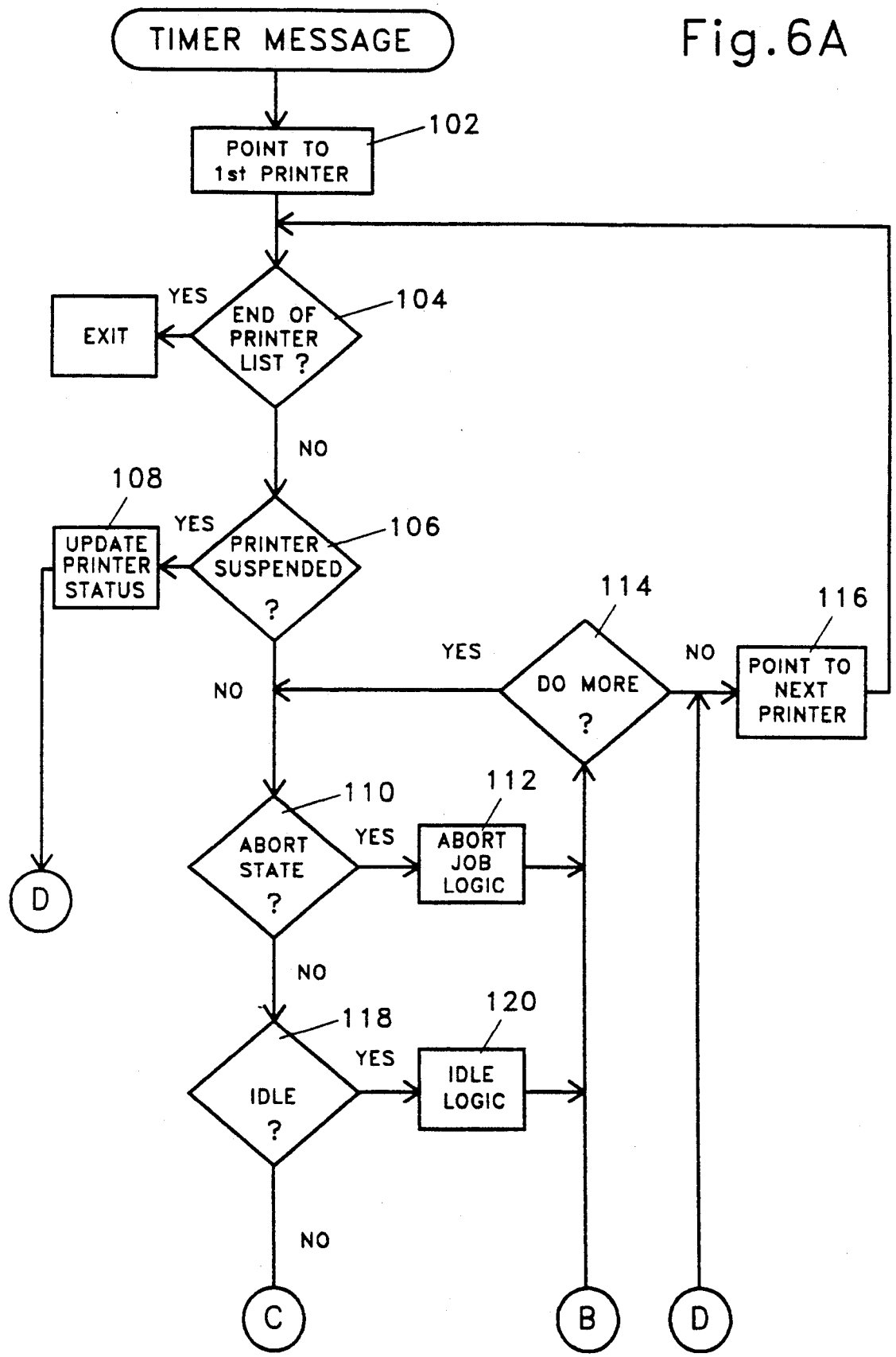
FIGS. 6A and 6B form a flow chart illustrating the Timer Message software subroutine of the spooler.
Figure 6B:
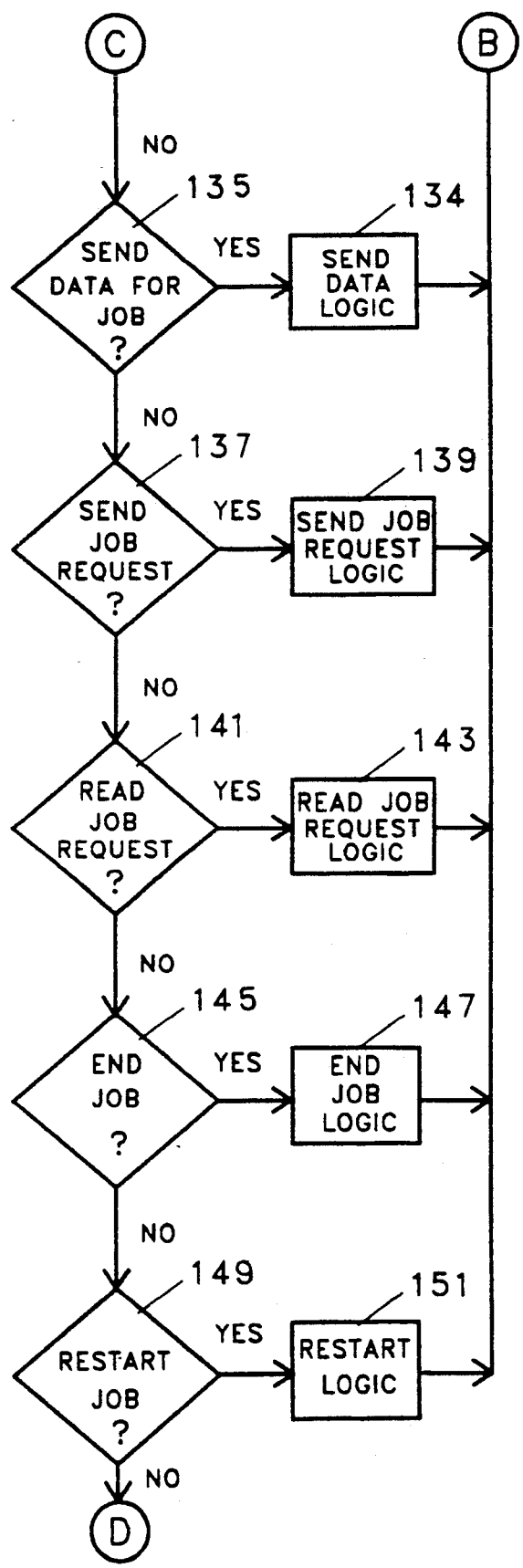

As discussed above, timer messages are periodically generated which cause the microprocessor to call the timer message subroutine depicted in FIG. 6. The rate at which the timer messages are generated is selectable by the user to a slow, medium or high rate. Timer messages are generated at a rate of, for example, four seconds irrespective of the user selected rate if the spooler does not have any jobs listed in its queues. If there are jobs on the spooler's queues however, the timer messages are generated at the user selected rate. Upon entering the timer message routine, the microprocessor 19 at block 102 sets a pointer to the first printer of the system. The pointer is incremented to point to subsequent printers at a block 116 so that each time a timer message is generated the microprocessor determines the state of each of the printers attached to the system and performs whatever operations are required for the printer's state. If the status of each of the printers of the system has not been checked as determined by the microprocessor at block 104, the microprocessor continues to block 106 to check the status of the printer pointed to.

The microprocessor 19 first determines at block 106 whether the particular printer identified in block 102 is suspended or not. If the printer is suspended, the microprocessor 19 updates the printer's status at a block 108 and increments the pointer to point to the next printer in the list at a block 116. If the printer was not suspended, the microprocessor determines at block 110 whether the printer is in the abort state. If so, the microprocessor 19 at block 112 instructs the printer to abort the current job being printed. The microprocessor also sends a string sequence to instruct the printer to enter a receive mode. This is to prevent the printer from being in a hung state. From block 112, the microprocessor 19 proceeds to block 114 to determine whether anything more is to be done for this printer. When proceeding to block 114 from the abort job logic at block 112, the microprocessor determines that there is nothing more to do for the printer and proceeds to block 116 to increment the pointer to the next printer.

Figure 7:
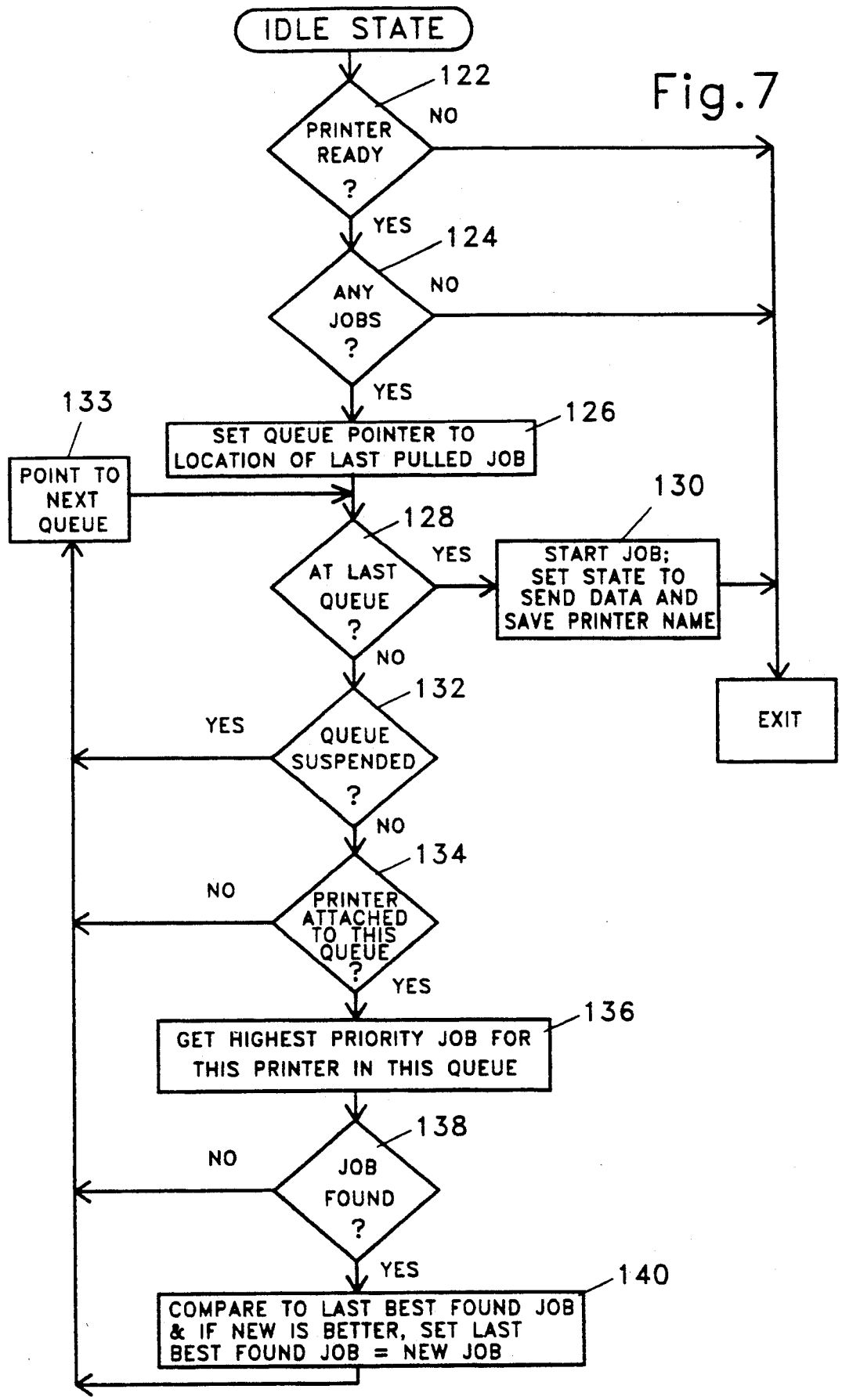
FIG. 7 is a flow chart illustrating the Idle software subroutine of the spooler.

If the microprocessor 19 determines at a block 118 that a printer is in an idle mode the microprocessor proceeds to block 120 to call the idle logic routine to select a job to be transmitted to the printer if the printer is ready to print a new job. More particularly, as shown in FIG. 7, upon entering the idle routine, the microprocessor 19 at block 122 performs a status poll on the printer to see if the printer is ready to print. Specifically, in performing the status poll, the microprocessor 19 causes a one byte inquiry message to be sent to the printer. The printer responds to the inquiry by transmitting three bytes of information. The first byte returned to the printer in response to a status poll is the inquiry message received by the printer; whereas the next two bytes represent the status of the polled printer. Each bit of the two status bytes provides information as to the status of the printer. More particularly, a first bit of the first status byte indicates whether the printer is on line, i.e., whether the printer is communicating with the P.C. 14. A second bit determines whether the printer is active, i.e., whether the printer is printing; whereas a third bit indicates whether the printer is busy, i.e., whether the holding buffer of the printer is full so that the printer cannot receive any more printing information from the P.C. 14. A fourth bit indicates whether there is an on line error or not such as whether the data or format are incompatible with the printer. A fifth bit indicates whether there is an operator correctable error such as the printer is out of stock, the printer is jammed, etc. The sixth bit of the first printer status byte indicates whether there is a printer component failure such as a bad print head, etc. The two remaining bits of the first status byte returned to the P.C. 14 are fixed. The second status byte returned to the P.C. 14 in response to a printer status poll includes one bit which determines whether there is an on line communication error such as a parity error, overrun error, etc. A second bit of this byte indicates whether there is a stock fault and a third bit indicates whether there has been a ribbon fault. A fourth bit of the second status byte indicates whether there is a problem in the post print handling of the tag or label such as may occur when the printer has attached thereto a rewinder, tag stacker, etc. Whenever the microprocessor 19 performs a status poll on a printer 10, 11, 12, 13, the microprocessor controls the display 18 to provide the status of the printer to the user, the display indicating to the user whether the printer is on line, active, or busy or whether the printer has an on line data or format error or a communication error, stock fault, ribbon fault or problem with post print handling as indicated by the returned status bytes. Since all status poll inquiries are handled immediately by the printer upon receipt thereof, the user is provided with immediate feedback as to the status of a printer each time a status poll is performed.

The microprocessor 19 determines that a printer is ready when it receives a response to the status poll inquiry indicating that the printer is on line and is not active or busy and does not have an error or problem indicated. Otherwise, the microprocessor 19 determines that the printer is not ready and returns to block 114 where the microprocessor further determines that there is nothing more to do for this printer. The microprocessor then proceeds to block 116 to increment the pointer so that the status of the next printer can be checked. After determining that a printer is ready for printing, the microprocessor proceeds from block 122 to block 124 to determine whether there are any jobs on any queue by checking a global count representing the number of jobs on all queues in the spooler. If there are no jobs on any queue waiting to be printed, the microprocessor proceeds to blocks 114 and 116 to check the status of the next printer. If there is at least one job on a queue, the microprocessor proceeds to block 126 to set a pointer to the queue representing the location of the last job distributed to a printer. Thereafter, the microprocessor searches for the highest priority nonsuspended job for the printer so that the job may be distributed thereto. Because the starting point of the search for the highest priority job is variable as set at block 126, all queues are fairly queried for the best job to be sent to a given printer.

If each of the queues has not been searched for a job for the printer as determined by the microprocessor at block 128, the microprocessor 19 proceeds to block 132 to determine whether the queue to which the pointer is set is suspended or not. If the queue is suspended as determined at block 132, the microprocessor proceeds to block 133 to increment the pointer to the next queue. This prevents a job from being distributed to a printer from a suspended queue. If the queue to which the pointer is set is not suspended, the microprocessor proceeds to block 134 to determine whether the idle printer is assigned to this particular queue. The microprocessor 19 makes this determination by checking the printer to queue assignment matrix.

If the idle printer is assigned to the queue, at block 136 the microprocessor gets from the queue the highest priority nonsuspended job listed therein that can be run on a printer of the same type as the idle printer. More particularly, the microprocessor 19 looks at the information stored in the queue for the highest priority job listed therein to determine whether the job can go to a printer that is of the same type as the idle printer. If the highest priority job cannot be printed on the idle printer, the microprocessor 19 looks at the information stored in the queue for the next highest priority job listed in the queue and so on. Once a job is found from the queue for the printer or if the microprocessor has checked each of the jobs in the queue and has not found one, the microprocessor proceeds to block 138. If a job has been found, the microprocessor at block 140 compares the highest priority job from the queue at which the pointer is set to the last best found job for this idle printer. If the newly found job is of a higher priority than the last found job, the newly found job replaces the last found job as the "best" found job for this printer. Thereafter, the microprocessor 19 proceeds to block 133 to increment the pointer to point to the next queue. Each of the queues is thus searched for the highest priority job that can be printed by a printer of the same type as the idle printer. After all of the queues have been searched, the microprocessor 19 proceeds to block 130 to start the job, setting the state of the printer to the send data state discussed in detail below.

Because multiple printers may be attached to a single queue, the microprocessor in accordance with the spooler idle routine determines which printer to use to print the job at the time that a printer is ready to print. This allows the print load to be evenly distributed among several attached printers so as make the best use of idle printers and increase the throughput of jobs. Because the spooler idle routine will not allow a job to be distributed to a printer until the printer is ready to print it, the job is printed as soon as possible and is never waiting to be printed by one particular printer when another printer is capable of printing the job and is idle. Further, if a print job is assigned to a queue and the job is such that it can only be printed on one printer type, the job will remain on the queue until a printer of that type becomes available. However, that job will not hold up jobs of lower priority from being printed first if a printer that is capable of printing those lower priority jobs becomes available first.

Figure 8:
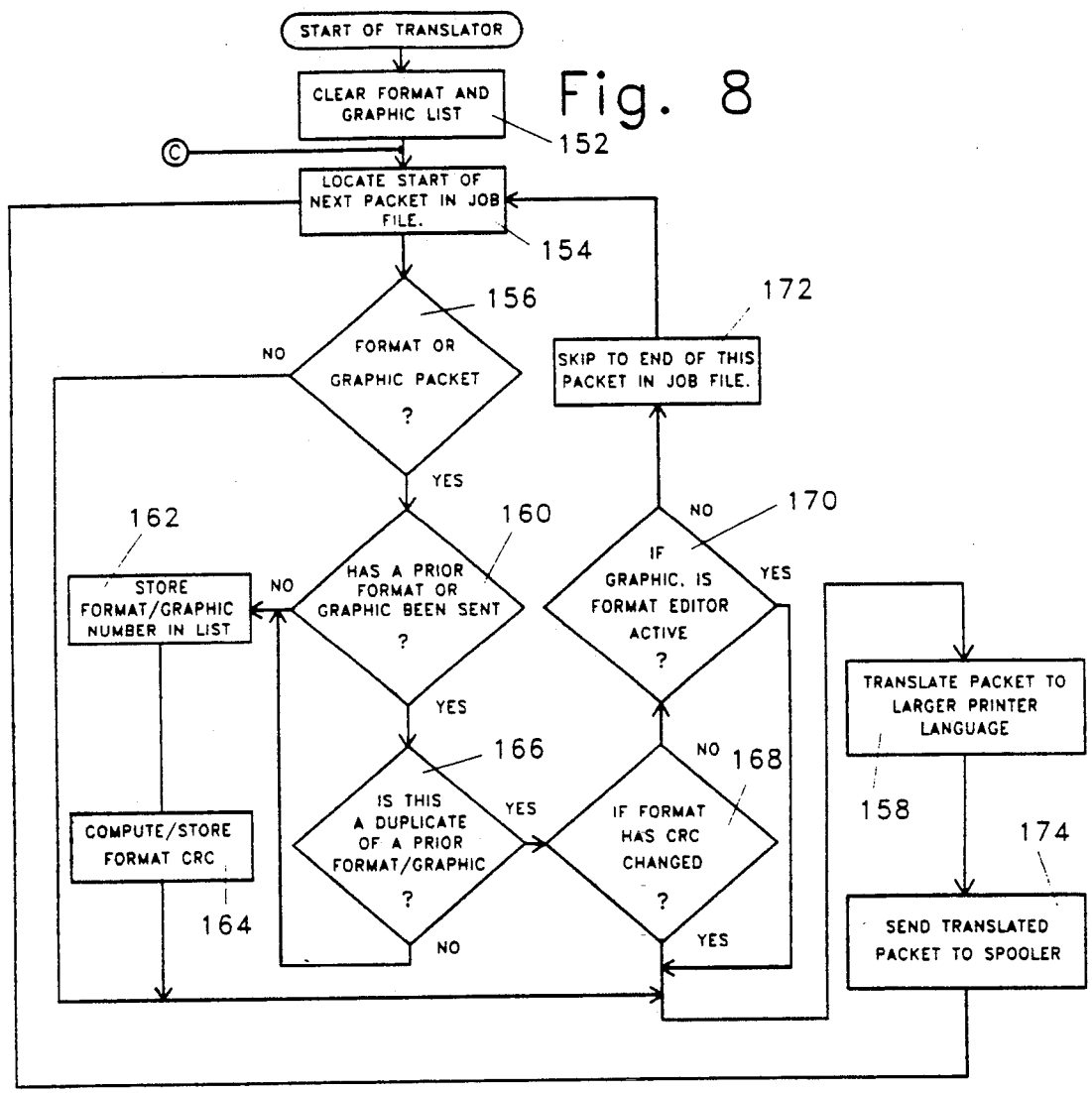
FIG. 8 is a flow chart illustrating the Translator software subroutine of the spooler.

After the state of the printer is changed in the idle routine from the idle state to the send data state, the microprocessor at block 114 determiness that there is more to do for this printer and proceeds to block 135 to implement the send data logic. At block 135, the microprocessor 19 calls the specific print driver or translator for the printer such as depicted in FIG. 8. The print driver or translator translates the packets of job information to be transmitted from the spooler 28 to a printer from a generic programming language to the specific language utilized by the printer. A suitable generic language for creating jobs is PROTALK developed by the asignee of the present patent application, this language being disclosed in U.S. patent application Ser. No. 07/787,770 entitled Barcode Identification System previously incorporated herein by reference. When the job is translated from the generic language to the printer specific language, the send data logic at block 134 causes the translated job to be sent in packets to the printer's associated output port for transmission to the printer for printing. Alternatively, the translated job may be sent to a disk for storage if the job is not be printed immediately. It is noted that because the translation of the job is performed at the time that the job is to be printed, the system of the present invention is very flexible in handling multi-printer formatted jobs.

When the send data logic at block 135 has finished transmitting a packet of information to the printer, the state of the printer is changed to the send job request state and the microprocessor at block 114 proceeds to block 137. Otherwise, the printer remains in the send data logic state. When in the send job request state as determined by the microprocessor 19 at block 137, the microprocessor at block 139 sends a job status request to the printer to see if the last packet of information transmitted has been successfully received. If the printer to which the job request is sent is not on line, the state of the printer remains in the send job request state, the microprocessor proceeding from block 119 to block 116. If, however, the printer was on line and the send job request was successfully transmitted, the state of the printer is changed to read job request and the microprocessor proceeds from block 114 to block 141 to read the status information requested for the job.

The status information requested at block 137 represents whether the printer is printing, whether there is an error status and further information regarding the format and values of the packet sent to the printer at block 135. At block 143, the microprocessor determines whether a response has been received from the printer to indicate that the last packet was successfully received and can be printed on the printer. The job status request sent at block 139 is processed at printer dependent time. Therefore if a maximum time limit during which a response from the printer should have been received has not expired and the job status response has not been received the microprocessor proceeds from block 143 to block 114 and from there to block 116 to check the status of the next printer. If, however, the requested job status response has been received, at block 143 the microprocessor changes the state of the printer to the send data state and the microprocessor proceeds from block 114 to block 131. The state of the printer is changed from the send data state, send job request state and read job request state as discussed above until all of the packets for a given job have been sent at which time the send data logic at block 135 changes the state of the printer to the end job state. It is noted that a job can be comprised of one or more packets of information including a data packet, a format packet and one or more graphic packets, wherein the packets of a job are sent to the printer one at a time in accordance with blocks 135, 137 and 143.

When the microprocessor 19 determines at block 145 that the state of a printer is the end job state, the microprocessor proceeds to block 147. The end job logic determines whether the job has been printed the number of times designated in the print command and if not, the end job logic changes the state of the printer to the restart job state. If however, the job has been printed a number of times equal to that specified in the job information stored in the job's queue, the microprocessor 19 moves the job from the current queue to a history queue with a completion status. The microprocessor 19 further informs the printer driver associated with the printer to clean up, i.e., to close the files for that job etc. The microprocessor also updates the status display associated with the printer as presented to the user on the display 18 to show that the printer is now idle, previously the display depicting that the printer was printing an identified job. If the microprocessor determines that the job is in the restart state at block 149, the microprocessor proceeds to block 151 to restart the printer driver/translator for the printer so as to start the job on the same printer that has just finished printing the job. This step eliminates the need to redistribute the job via the idle routine. Further, the translator of the printer driver determines whether the format and graphic information for a particular job has already been sent to a printer and if so the information is not retransmitted as discussed below with reference to FIG. 8.

A print driver translator routine is depicted in FIG. 8. Upon entering the routine, the microprocessor 19 at block 152 clears a format and graphic list to initialize the translator. Block 152 is performed the first time that the translator is read from disk into memory 20. Otherwise, the microprocessor 19 enters the translator routine at block 154. At block 154, the microprocessor locates the start of the next packet in the job file to be translated. Thereafter at block 156 the microprocessor determines whether the packet is a format or graphic packet. If the packet is neither a format or graphic packet, the microprocessor proceeds to block 158 to translate the packet of information from the generic language of the system to the language of the printer that the spooler has designated to receive the job for printing.

If the packet is a format packet or a graphic packet the microprocessor 19 proceeds to block 160 from block 156. If the packet is a format packet the microprocessor determines at block 160 whether a prior format packet has been sent to the printer for which the print driver/translator has been called. Similarly, if the packet is a graphic packet, the microprocessor determines at block 160 whether a prior graphic packet has been sent to the printer. If the packet is a format packet and no prior format has been sent to the spooler or if the packet is a graphic packet and no prior graphic packet has been sent to the spooler, the microprocessor proceeds to block 162 to store the format number for a format packet or a graphic number for a graphic packet in a format and graphic list. It is noted that each packet of information includes a header with information designating the type of packet, i.e., format packet, graphic packet or data packet. The header also includes a format identification number or a graphic identification number. The format and graphic identification numbers are unique numbers identifying the particular format or graphic. It is this format or graphic number that is stored in the respective format or graphic list at block 162. From block 162 the microprocessor proceeds to block 164 to determine whether the packet is a format and if so the microprocessor computes and stores a 16 bit cyclical redundancy check word. Thereafter, the microprocessor 19 proceeds to block 158.

If the microprocessor 19 determines at block 160 that a prior format packet or graphic packet has been sent to the spooler as discussed above, the microprocessor proceeds to block 166 to determine whether the present format or graphic packet is a duplicate of a prior packet the identification number of which was stored at block 162. At block 166, the microprocessor 19 compares the format number or graphic number, depending upon whether the packet is a format or graphic packet, to the respective format or graphic identification number stored at block 162. If the numbers do not match such that a new format packet or a new graphic packet is being sent to the printer, the microprocessor proceeds to block 162 to store the present format number or graphic number in the list. Depending upon the number of formats or graphics that a printer is capable of storing, the microprocessor at block 162 may write over the last format or graphic number in the list with the respective format or graphic number of the new packet being sent. Alternatively, if the printer is capable of storing a number of formats or graphics, the microprocessor 19 at block 162 may add the new format number or graphic number to the list while retaining the old numbers. New format and graphic numbers will be added to the list until the maximum storage number is reached at which time the oldest respective format number or graphic number will be deleted as the new format and graphic numbers are added. If at block 166 the microprocessor 19 determines that a format number or a graphic number is a duplicate of a respective format number or graphic number stored in the format and graphic list, the microprocessor proceeds to block 168. If the packet is a format packet, the microprocessor at block 168 checks the cyclical redundancy check word of the format to determine whether it has changed from that stored at block 164. This check is made to insure that the data defining the format has not changed even though the format identification number remains the same. If the cyclical redundancy check word of the format has changed, the microprocessor proceeds to block 158 to translate the format packet to the target printer language and thereafter sends the translated packet back to the spooler 28 in the send data logic state as discussed above at block 174. If the cyclical redundancy check word of the format has not changed the microprocessor proceeds to block 172 to skip to the end of this packet in the job file thereby preventing the retranslation and retransmission of a format that has already been sent to a printer and retained therein. If the packet is a graphic packet the microprocessor at block 170 determines whether the format editor is active or not. If the format editor is active and running, there is a chance that the graphic information is being changed so that the microprocessor 19 does not suppress the translation and transmission of the graphic packet, the microprocessor proceeding from block 170 to blocks 158 and 174. However, if the format editor is not active the microprocessor proceeds to block 172 to skip to the end of the graphic packet in the job file so as to suppress the retranslation and retransmission of a graphic packet that has already been transmitted to the printer and retained therein. The microprocessor then proceeds to block 154 to locate the next packet in the job file.

Because the translator suppresses the translation and transmission of format and graphic packets that have already been sent to the printer and retained therein, the printer does not have to re-image the entire format or graphic information thereby minimizing the processing time for printing jobs with respective formats or graphics. Also, the time which would otherwise be required to transmit the format packet or graphic packet to the printer is not needed. It is noted that frequently, successive jobs are run on printers wherein the format or graphical information does not change but the data portion of the job does change. Therefore, the translator of the present invention is extremely efficient and aids the printer in minimizing the processing time of a job.

Figure 9:
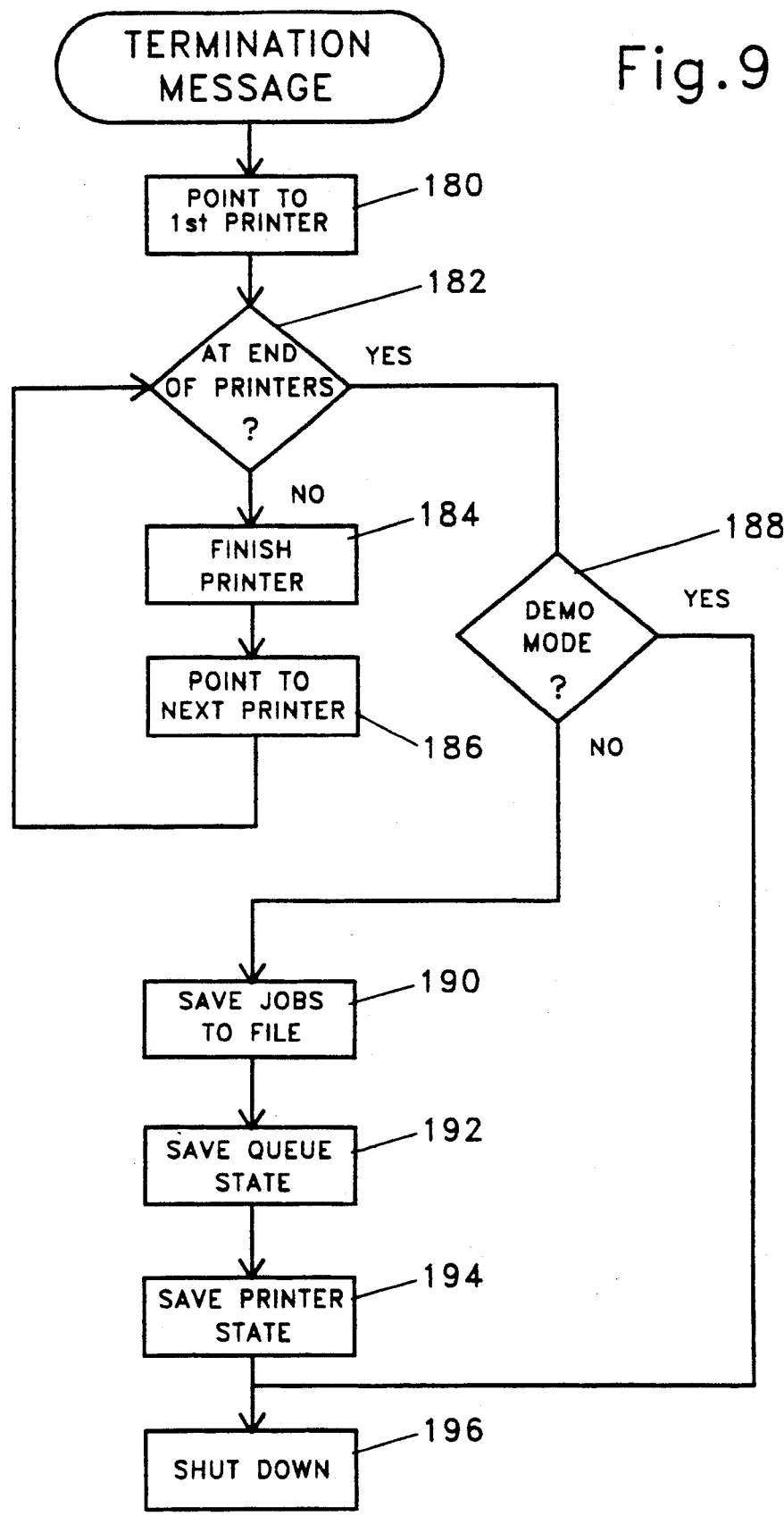
FIG. 9 is flow chart illustrating the Terminate software subroutine of the spooler.

As discussed above, a terminate message will cause the spooler 28 to operate in accordance with the flow chart depicted in FIG. 9. When the spooler 28 terminates it can be in one of three states: (1) an idle state in which there are no jobs on any queue; (2) a processing state in which it is processing jobs on printers; or (3) a state in which there are jobs on the queues but they are not being processed on printers. If the spooler 28 is not currently processing any jobs when it is terminated, all of the jobs on the spooler's queues are saved in memory to be automatically resubmitted on the subsequent startup of the spooler. If jobs are being processed on the printers, then the microprocessor 19 prompts the user via the display 18 to inform the spooler as to how it should be terminated. The user can select to cancel the terminate message; the spooler may terminate without saving the current processing state of the jobs; or the spooler may terminate saving the current processing state.

If the user chooses to terminate the spooler without saving the current processing state of the jobs, the jobs currently being processed on the printers are aborted and their state changed to waiting. All of the jobs are then saved to a file to be restored and started from the beginning upon the next startup of the spooler. If the spooler is terminated and the user chooses to save the current processing state of the jobs, the microprocessor 19 saves all of the jobs on the queues to a file, and further saves the states of the processing jobs so that each job can continue on the same printer if the printer is still attached to the system when the spooler is later restarted. When saving a job, if a job is on a queue waiting to be distributed to a printer, then the job is merely written to a save file. If, however, the job desired to be saved is in the process of being printed then the microprocessor 19 attempts to get the job to a quiescent state such that a complete data stream has been sent to the printer. Once in such a quiescent state, if the job is still unfinished, the current output state of the job is saved with the job. This output state includes the identification of the printer that the job was printing on and the point in the job file at which the job was stopped.

Upon restarting the spooler, the microprocessor 19 establishes queue and printer tables as configured by the user during the spooler configuration process. The microprocessor 19 further reads the job save file and re-queues all the jobs. If a job was in a wait state, the job is simply re-queued. If a job was printing when the spooler was terminated, in addition to being re-queued, the job is reestablished for printing immediately on the printer that was previously processing the job when the spooler 28 was terminated. If the destination queue of the job no longer exists, the job is posted in a history queue. Further, if the printers were reconfigured such that the job no longer has a printer on the queue to be output to, then the job is also posted in the history queue. Finally, if the job being re-queued is one that was processing when the spooler was terminated, and the printer to which it was being transmitted is no longer on the queue, then the job is queued as a new job as discussed above.

Figure 10A:
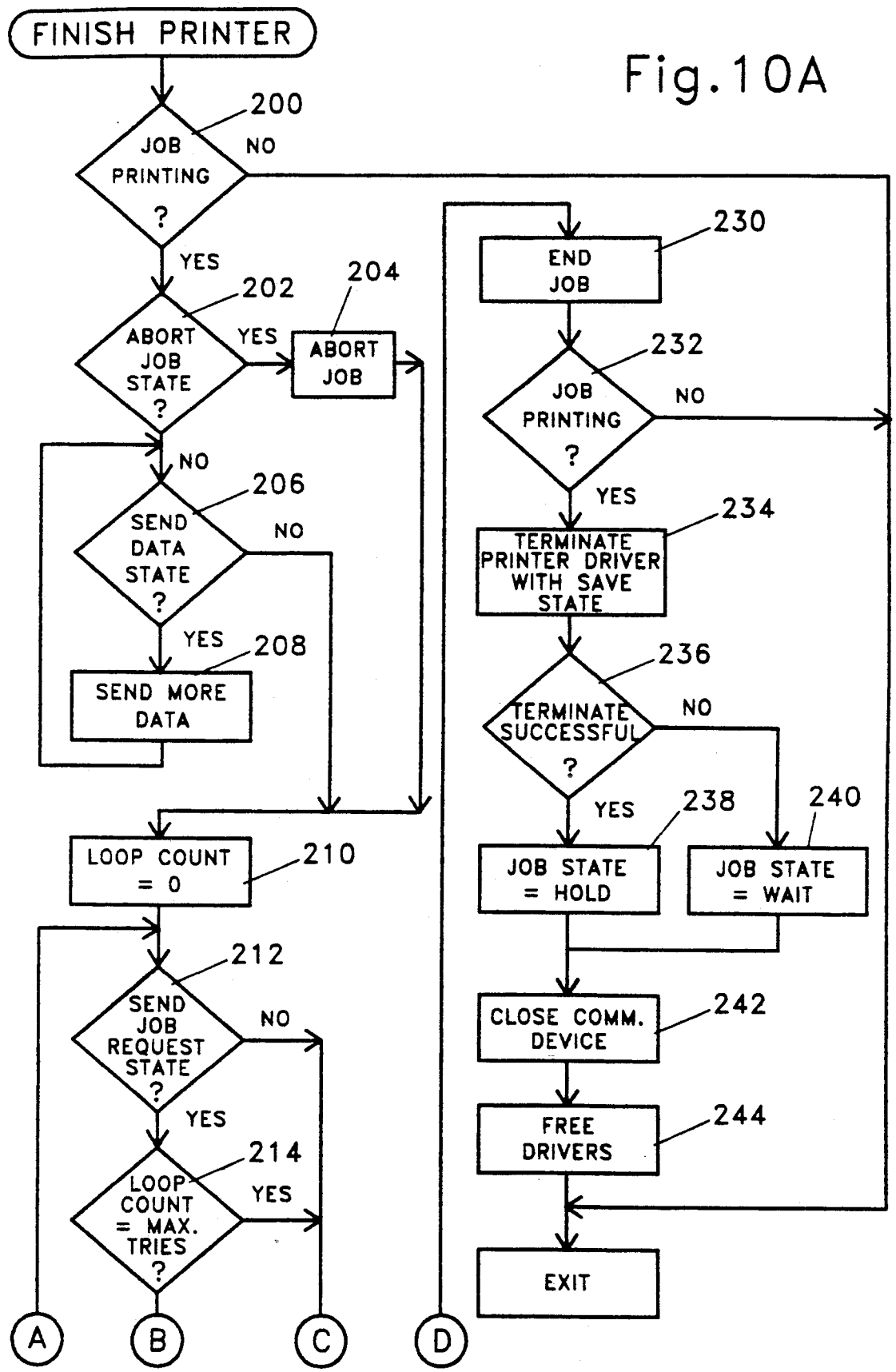
FIGS. 10A and B form a flow chart illustrating the Finish Printer software subroutine of the spooler.
Figure 10B:
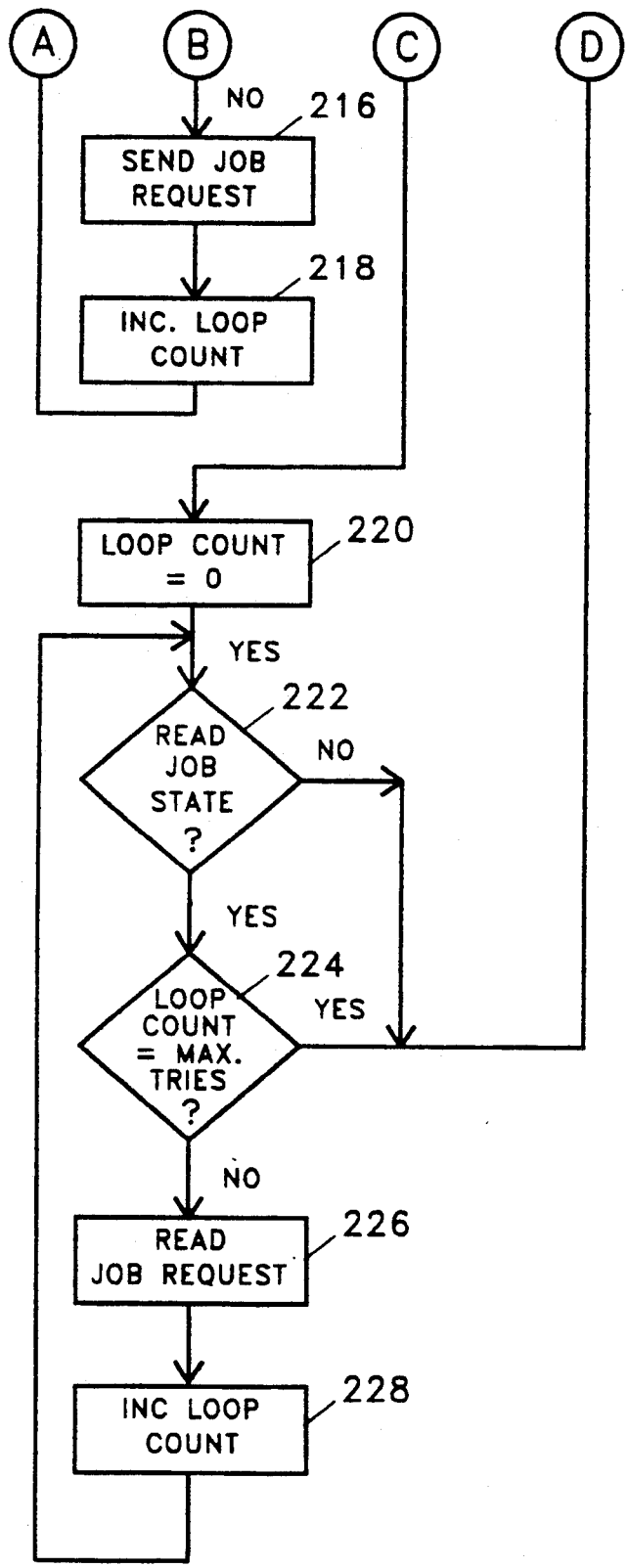

More particularly, upon entering the terminate routine, the microprocessor at block 180 sets a pointer to a first printer. If the microprocessor 19 has not terminated all of the printers as determined at block 182, the microprocessor at block 184 implements a finish printer routine as shown in FIG. 10. Upon entering the finish printer routine, the microprocessor at block 200 determines if a job is printing and if not, the microprocessor returns to the terminate routine at block 186 to increment the pointer to the next printer to be terminated. If, however, the microprocessor determines at block 200 that a job is in the process of being printed, i.e., that the spooler is still transmitting at least a portion of the job to the printer, the microprocessor proceeds to block 202.

If the microprocessor determines at block 202 that the job is in the abort state, the microprocessor at block 204 aborts the job and proceeds to block 210. Otherwise, the microprocessor 19 proceeds to block 206 to determine whether the printer is in the send data state. If the printer is in the send data state, the microprocessor 19 proceeds to block 208 to send more data to the printer in an attempt to get the job to a quiescent state such that a complete data stream for a packet has been sent. Upon completing the data stream for the current packet being transmitted, the state of the printer is changed to the send job request state and the microprocessor proceeds from block 206 to block 208 wherein a loop counter is initialized to zero.

At block 212 the microprocessor determines whether the printer is in the send job request state and if so, proceeds to block 214 to determine whether the loop counter has reached the maximum number of tries. If the printer is off line, block 214 prevents the microprocessor 19 from being hung up waiting to send a job request to a printer that it cannot communicate to. If the loop counter has not reached the maximum number of tries, the microprocessor proceeds to block 216 to implement the send job request logic as discussed above with respect to the timer message routine depicted in FIG. 6. Thereafter, the microprocessor at block 218 increments the loop counter. Upon successfully sending the job request to the printer, the state of the printer changes to the read job request state so that the microprocessor proceeds from block 212 to block 220 to initialize another loop counter. Thereafter at block 222 the microprocessor determines if the printer is still in the read job state and if so, the microprocessor at block 224 determines whether the loop counter for the read job state has reached its maximum value. If not, at block 226 the microprocessor 19 implements the read job logic as discussed above with reference to FIG. 6 and at block 228 increments the loop counter. If the job state has been successfully read by the microprocessor 19 for the printer or the loop counter has reached its maximum value as determined at block 224, the microprocessor proceeds to block 230 to implement the end job logic as discussed above with respect to FIG. 6.

At block 232, the microprocessor determines whether the job was in the process of printing and if not, the microprocessor proceeds to block 186 to continue the terminate routine. If, however, the microprocessor at block 232 determines that the job was in the process of being printed, the microprocessor proceeds to block 234 to terminate the print drivers with a save state if the user has indicated that he wishes to terminate the job and save the current processing state. At block 236 the microprocessor 19 determines whether the job was terminated successfully. A job will not terminate successfully, for example, if there was not enough disk space to store the job state. A job terminated unsuccessfully will cause the microprocessor 19 to proceed to block 240 to designate that the job's state is the wait state. If, however, the job was terminated successfully, the microprocessor at block 238 designates the job's state is a hold state indicating that the job is to be restarted. Thereafter at block 242 the microprocessor 19 closes the communication device of the system and at block 244 frees the print drivers.

When the microprocessor has finished terminating each printer in the system as determined at block 182, the microprocessor at block 188 determines whether the system was operating in a demonstration mode. If the user was operating in a demonstration mode, nothing is saved and the system is shut down at block 196. If, however, the system was not operating in a demonstration mode, the microprocessor at block 190 saves the jobs to the save file and at block 192 saves the state of each of the queues. Thereafter, at block 194 the microprocessor 19 saves the printers' states and shuts down the spooler at block 196.

Upon restarting or starting the spooler, the microprocessor 19 performs an initialization routine as depicted in FIG. 11. At block 250 the microprocessor first initializes various parameters such as setting various counters to zero, etc. Thereafter, at block 252 the microprocessor 19 sets up the printers by reading in the printer's name, the printer type, the communication port associated with the printer, etc. into a printer table The microprocessor 19 also opens the communication port, i.e., initializes the port for communication between the P.C. 14 and the printers. At block 254 the microprocessor 19 sets up the queues of the spooler by reading in the printer-queue assignments from the printer-queue matrix as configured by the user. At block 256 the microprocessor 19 removes any unused printers or printers that have failed to initialize as well as removing unused queues from the printer and queue tables so as to simplify these tables. Thereafter, at block 258 the microprocessor restores jobs by reading each job from the save file and calling the queue job routine depicted in FIG. 3. If a job is being restored, the queue restore job routine adds the job to the designated destination queue and starts the printer drivers for the printer that had been printing the job when the spooler was terminated as discussed above. Thereafter, the microprocessor proceeds to block 260 wherein a timer message is forced to cause the microprocessor 19 to enter the timer message routine depicted in FIG. 6.

The spooler of the present invention is flexible in its configuration to meet the various needs of the users. The spooler efficiently distributes jobs to the various printers of the system in order to increase the throughput of the jobs. The spooler further minimizes processing time not only at the P.C. but also at the printer by enabling jobs terminated while in the process of printing to be restarted at the point in the job where termination occurred as opposed to restarting the job at its beginning. Format and graphic packets previously transmitted to a printer and stored therein are not retransmitted also minimizing the processing time of various print jobs.

Many modifications and variations of the present invention are possible in light of the above teachings. Thus, it is to be understood that, within the scope of the appended claims, the invention may be practiced otherwise than as described herein above.

What is claimed and desired to be secured by Letters Patent is:

1. In a barcode identification system having a plurality of barcode printers and a plurality of jobs to be printed, said jobs being stored in a memory, a spooler for distributing said plurality of jobs to said printers comprising:

a plurality of queues, each queue providing a prioritized list of jobs to be printed;

means for assigning said plurality of printers to said plurality of queues, said assigning means being capable of assigning multiple printers to one queue wherein each printer assigned to said one queue need not be capable of printing every job listed in said one queue;

means for determining whether a printer is ready to print a new job;

means responsive to a ready printer determination for searching each of said plurality of queues for the highest priority job capable of being printed on said ready printer; and means for transferring the highest priority job to said ready printer.

2. The barcode identification system recited in claim 1 wherein said assigning means includes a user actuated input device for assigning printers to queues.

3. The barcode identification system recited in claim 2 wherein said assigning means includes means for displaying a matrix having a plurality of data entry positions each position being uniquely associated with one of said plurality of printers and one of said plurality of queues, said input means being actuable by a user to mark a matrix position to assign a printer to a queue.

4. The barcode identification system recited in claim 1 wherein said assigning means is capable of assigning one printer to multiple queues.

5. The barcode identification system recited in claim 1 including means for polling each of said printers to determine the status of said printer; and means for receiving status information from a printer, said status information including information indicating whether said printer is active in performing a printing operation, information indicating whether said printer can receive at least a portion of a job; and information indicating the occurrence of an error and the nature of the error as an online error, printer operator error, or printer component problem.

6. The barcode identification system recited in claim 1 wherein said job transferring means includes means for transferring said job in one or more packets and said system includes means for requesting the termination of the operation of said spooler; said spooler including means responsive to a termination request for completing the transmission of any packet currently being transmitted and means for storing information identifying the next packet of the job to be transmitted if any.

7. The barcode identification system recited in claim 6 including means for restarting the transmission of a job at said identified next packet.

8. The barcode identification system recited in claim 1 wherein a number of said jobs to be printed include a format packet having information identifying how said job is to be printed; said spooler including means for storing a record of a format packet transmitted to a printer for at least one job and means for preventing the retransmission of the same format packet to said printer for a subsequently transmitted job.

9. The barcode identification system recited in claim 1 wherein a number of said jobs to be printed include a graphic packet having data defining graphics to be printed, said spooler including means for storing a record of a graphic packet transmitted to a printer for at least one job and means for preventing the retransmission of the same graphic packet to said printer for a job to be transmitted to said printer subsequent to said one job.

10. A barcode identification system comprising:

a plurality of queues, each queue providing a list of jobs to be printed and each job identifying at least one type of printer that is capable of printing said job;

a plurality of printers each assigned to a queue, at least one of said queues having a first printer of a first type and a second printer of a second type assigned thereto, said first and second printer types being incompatible; and a spooler for distributing jobs listed in said queues to said printers, said spooler searching each of said queues for a first job that is capable of being printed by a printer of said first printer type to distribute said first job to said first printer and said spooler searching each of said queues for a second job that is capable of being printed by a printer of said second printer type to distribute said second job to said second printer.

11. A barcode identification system as recited in claim 10 wherein said first and second jobs are listed in said one queue and said first printer is not capable of printing said second job.

12. A barcode identification system as recited in claim 10 wherein said spooler includes means for determining whether a printer is ready to print a job, said spooler being responsive to a ready determination to search said queues for a job capable of being printed on a printer of the same type as said ready printer.

13. A barcode identification system as recited in claim 10 wherein at least one of said plurality of printers is assigned to a plurality of queues.

14. A barcode identification system as recited in claim 10 including a user actuated input device for assigning printers to queues; and means for displaying a matrix having a plurality of data entry positions each position being uniquely associated with one of said plurality of printers and one of said plurality of queues, said input means being actuable by a user to mark a matrix position to assign a printer to a queue.

15. The barcode identification system recited in claim 10 including means for polling each of said printers to determine the status of said printer; and means for receiving status information from a printer, said status information including information indicating whether said printer is active in performing a printing operation, information indicating whether said printer can receive at least a portion of a job; and information indicating the occurrence of an error and the nature of the error as an online error, printer operator error, or printer component problem.

16. A barcode identification system as recited in claim 10 wherein a job includes a plurality of groups of job information and said system includes means for terminating the operation of said spooler, said spooler including means responsive to said termination means for completing the distribution of a group of job information currently being distributed to a printer and means for identifying the next group of information to be transmitted to said printer for said job upon a restarting of said spooler operation.

17. A barcode identification system as recited in claim 16 wherein said spooler includes means for restarting the distribution of said job to said printer at said identified next group of information upon the restarting of said spooler operation.

18. The barcode identification system recited in claim 10 wherein a number of said jobs to be printed include a format packet having information identifying how said job is to be printed; said spooler including means for storing a record of a format packet transmitted to a printer for at least one job and means for preventing the retransmission of the same format packet to said printer for a subsequently transmitted job.

19. The barcode identification system recited in claim 10 wherein a number of said jobs to be printed include a graphic packet having data defining graphics to be printed, said spooler including means for storing a record of a graphic packet transmitted to a printer for at least one job and means for preventing the retransmission of the same graphic packet to said printer for a job to be transmitted to said printer subsequent to said one job.

20. A barcode identification system comprising:
a plurality of queues, each queue providing a prioritized list of jobs to be printed;
a plurality of printers each assigned to a queue, at least one of said queues having multiple printers assigned thereto wherein each printer assigned to said one queue need not be capable of printing every job listed in said one queue; and
a spooler distributing a job to a printer, said spooler searching each of said queues for the highest priority job capable of being printer by said printer.

21. A barcode identification system as recited in claim 20 wherein said spooler includes means for determining whether a printer is ready to print a job, said spooler being responsive to a ready determination to search said queues for a job capable of being printed.

22. A barcode identification system as recited in claim 20 wherein at least one of said plurality of printers is assigned to a plurality of queues.

23. A barcode identification system as recited in claim 20 including a user actuated input device for assigning printers to queues; and means for displaying a matrix having a plurality of data entry positions each position being uniquely associated with one of said plurality of printers and one of said plurality of queues, said input means being actuable by a user to mark a matrix position to assign a printer to a queue.

24. The barcode identification system recited in claim 20 including means for polling each of said printers to determine the status of said printer; and means for receiving status information from a printer, said status information including information indicating whether said printer is active in performing a printing operation, information indicating whether said printer can receive at least a portion of a job; and information indicating the occurrence of an error and the nature of the error as an online error, printer operator error, or printer component problem.

25. A barcode identification system as recited in claim 20 wherein a job includes a plurality of groups of job information and said system includes means for terminating the operation of said spooler, said spooler including means responsive to said termination means for completing the distribution of a group of job information currently being distributed to a printer and means for identifying the next group of information to be transmitted for a job to said printer upon a restarting of said spooler operation.

26. A barcode identification system as recited in claim 25 wherein said spooler includes means for restarting the distribution of said job to said printer at said identified next group of information upon the restarting of said spooler operation.

27. The barcode identification system recited in claim 20 wherein a number of said jobs to be printed include a format packet having information identifying how said job is to be printed; said spooler including means for storing a record of a format packet transmitted to a printer for at least one job and means for preventing the retransmission of the same format packet to said printer for a subsequently transmitted job.

28. The barcode identification system recited in claim 20 wherein a number of said jobs to be printed include a graphic packet having data defining graphics to be printed, said spooler including means for storing a record of a graphic packet transmitted to a printer for at least one job and means for preventing the retransmission of the same graphic packet to said printer for a job to be transmitted to said printer subsequent to said one job.

29. A barcode identification system as recited in claim 20 wherein said spooler distributes jobs to said printers for simultaneous operation of a number of said printers.

* * * * *

UNITED STATES PATENT AND TRADEMARK OFFICE
CERTIFICATE OF CORRECTION

PATENT NO.  : 5,287,434
DATED       : February 15, 1994
INVENTOR(S) : Bain et al.

It is certified that error appears in the above-indentified patent and that said Letters Patent is hereby corrected as shown below:

Col. 11, line 42, delete -- becoms -- and insert -- becomes -- therefore.

Col. 11, line 57, delete -- No. 07/787,770 -- and insert -- No. 07/783,770 -- therefore.

Col. 11, line 64, insert -- to -- after -- job is not --.

Signed and Sealed this

Thirteenth Day of February, 1996

Attest:

BRUCE LEHMAN

Attesting Officer    Commissioner of Patents and Trademarks